United States Patent [19]
Brehob et al.

[11] Patent Number: 5,482,017
[45] Date of Patent: Jan. 9, 1996

[54] REDUCTION OF COLD-START EMISSIONS AND CATALYST WARM-UP TIME WITH DIRECT FUEL INJECTION

[75] Inventors: Diana D. Brehob, Dearborn; Richard W. Anderson, Ann Arbor; Jialin Yang; Robert M. Whiteaker, both of Canton, all of Mich.

[73] Assignee: Ford Motor Company, Dearborn, Mich.

[21] Appl. No.: 383,132

[22] Filed: Feb. 3, 1995

[51] Int. Cl.⁶ .............................. F02B 3/04; F02D 43/00
[52] U.S. Cl. ........................................... 123/299; 123/424
[58] Field of Search .................................... 123/299, 300, 123/305, 421, 424

[56] References Cited

U.S. PATENT DOCUMENTS

| | | | |
|---|---|---|---|
| 4,432,325 | 2/1984 | Auracher et al. | 123/424 |
| 4,480,620 | 11/1984 | Tange et al. | 123/305 |
| 4,955,339 | 9/1990 | Sasaki et al. | 123/295 |
| 5,207,058 | 5/1993 | Sasaki et al. | 60/284 |

*Primary Examiner*—Andrew M. Dolinar
*Attorney, Agent, or Firm*—Allan J. Lippa; Roger L. May

[57] ABSTRACT

An internal combustion engine employs fuel injectors positioned to inject fuel directly into combustion chambers of the engine, and an electronic engine controller (EEC) to control operation of the engine. The EEC implements a cold start routine which controls the amount of fuel injected, the time at which the fuel is injected and spark timing to achieve a rapid increase in temperature of the engine and the exhaust system components, thereby decreasing tailpipe hydrocarbon emissions during cold start.

13 Claims, 2 Drawing Sheets

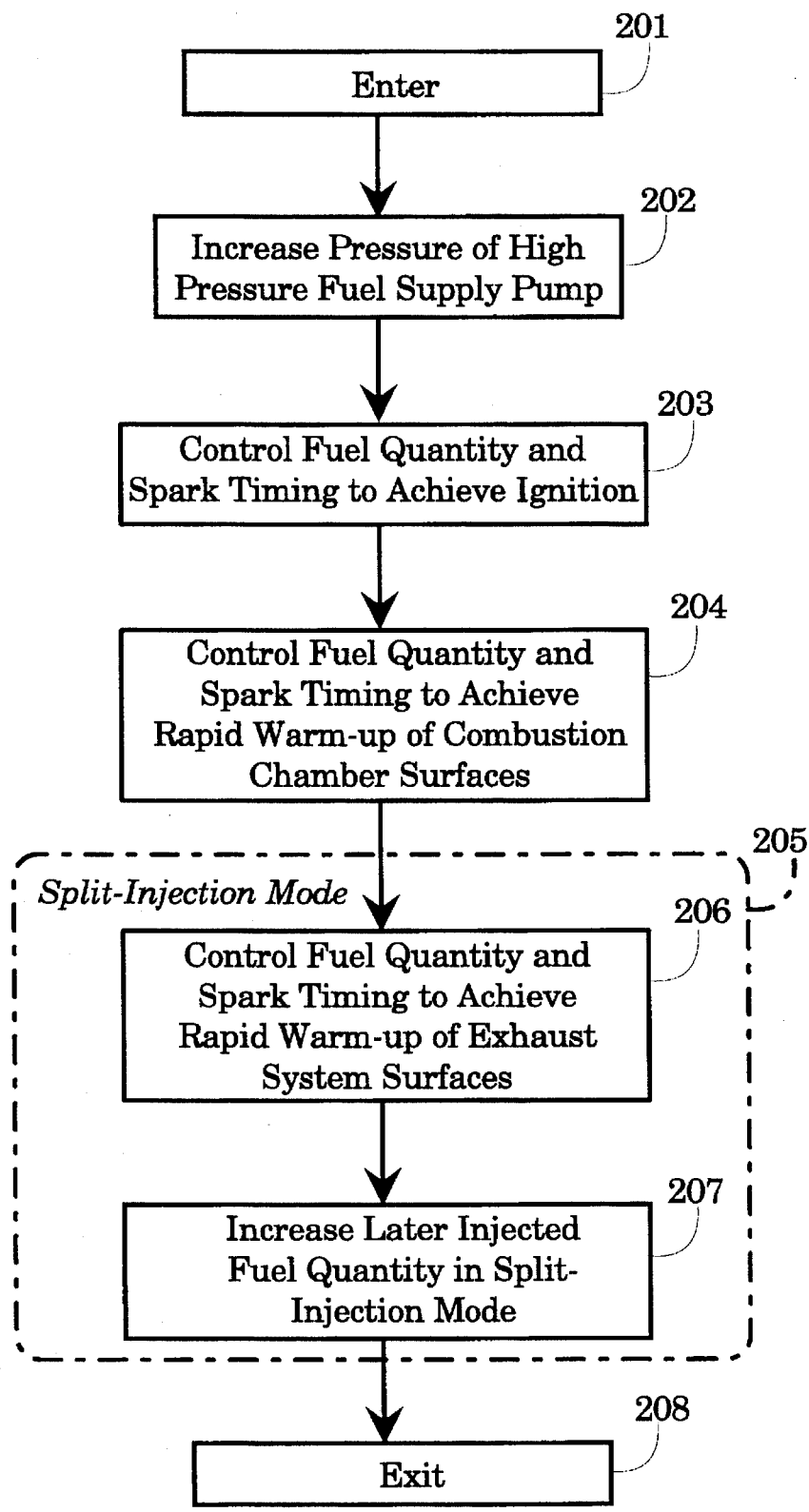

REDUCTION OF COLD-START EMISSIONS AND CATALYST WARM-UP TIME WITH DIRECT FUEL INJECTION

FIELD OF THE INVENTION

This invention relates to the field of electronic engine control and more particularly to the field of reducing hydrocarbon emissions during cold start in a spark ignited internal combustion engine which employs direct fuel injection.

BACKGROUND OF THE INVENTION

A disproportionately large amount of the hydrocarbons produced by a vehicle are emitted during cold starting of the vehicle engine. The temperature of the intake passages and the combustion chambers of the engine during the early stages of a cold start inhibit the proper vaporization of fuel. As a result, during cold start, a stoichiometric air/fuel ratio is difficult to achieve with intake port fuel injection. In addition, unburned fuel vapor is delivered to the catalytic converter together with the normal by-products of combustion. During the early stages of a cold start, the catalyst material in the catalytic converter has not reached a sufficient temperature in order to sufficiently process the unwanted, and uncombusted, by-products of combustion. Tailpipe emissions of hydrocarbons thus increase as a result of all three of the foregoing factors.

One solution to reducing hydrocarbon emissions during a cold start is the use of an Electrically Heated Catalyst (EHC). The EHC employs resistive elements which heat the catalyst prior to starting the engine. In cold start, the heated catalyst is thus better able to process the unwanted by-products of combustion. Unfortunately, use of the EHC adds additional cost, extra complexity, and requires a delay prior to engine starting to allow the EHC to preheat the catalyst.

The inventors herein have recognized that direct fuel injection may be used to advantage in reducing hydrocarbon emissions during cold start. Direct fuel injection offers control of fuel delivery unachieveable with intake port fuel injection, where the fuel injector is positioned outside of the combustion chamber. Others have utilized direct fuel injection to achieve engine control strategies unachievable in engines utilizing intake port fuel injection. For example, Sasaki et al. in U.S. Pat. No. 5,207,058 entitled *Internal Combustion Engine* describe an engine which utilizes direct fuel injection and which employs a control strategy to raise the temperature of the catalytic converter if it is found to be below a predetermined minimum temperature. However, Sasaki et al. do not contemplate reduction of hydrocarbon emissions by achieving immediate combustion as quickly as possible upon cold start. Moreover, Sasaki et al. appear to contemplate an engine which has achieved stable combustion. Thus, the approach contemplated by Sasaki et al. has limited use in cold start of an engine.

SUMMARY OF THE INVENTION

It is an object of the present invention to reduce hydrocarbons produced during cold start of a spark ignited internal combustion engine by employing direct fuel injection to achieve rapid combustion and reduce catalyst warm-up time.

In accordance with the primary object of the invention, in a preferred embodiment, hydrocarbon emissions during cold start are reduced by employing an internal combustion engine which includes fuel injectors positioned to inject fuel directly into combustion chambers of the engine, a high pressure fuel supply pump for pumping fuel to the fuel injectors, and an engine controller for controlling operation of the engine. At engine start, upon initiation of electrical power to the engine, the electronic engine controller allows a predetermined period of time to elapse to allow the high pressure fuel supply pump to reach a predetermined operating pressure. Upon the first engine cycle, for each cylinder of the engine, the quantity of fuel injected into each cylinder and the ignition timing is controlled to achieve combustion in the first engine cycle by injecting a quantity of fuel to compensate for combustion chamber wall wetting effects and to achieve a substantially stoichiometric air/fuel ratio in each combustion chamber, and controlling spark timing according to an empirically determined value which provides the greatest probability for ignition. For a first predetermined number of subsequent engine cycles, the quantity of fuel injected into each cylinder and the spark timing is controlled to rapidly increase the temperature of surfaces of the combustion chambers by injecting a quantity of fuel into each combustion chamber to achieve an air/fuel ratio substantially equal to or marginally leaner than a stoichiometric air/fuel ratio and advancing spark timing in each cylinder by a predetermined number of degrees of crankshaft rotation from a predetermined optimal ignition timing point. For a subsequent, second predetermined number of engine cycles, the quantity of fuel injected into each cylinder and the spark timing is controlled to rapidly increase the temperature of the surfaces of the exhaust system components of the engine, by injecting a first quantity of fuel for each engine cycle during the intake stroke of the engine cycle and injecting a second quantity of fuel later in the same engine cycle during the combustion stroke of the engine cycle, and retarding spark timing for each cylinder from the predetermined optimal ignition timing point.

An advantage of certain preferred embodiments is that combustion is achieved on the first engine cycle, thus reducing the emission of unburned gasoline vapors. Moreover, by controlling the quantity of fuel delivered and the spark timing in a manner to rapidly warm-up the surfaces of the combustion chamber, combustion stability and efficiency is further enhanced, resulting in further reductions of tailpipe emissions of hydrocarbons. Finally, by then controlling the quantity of fuel delivered and the spark timing in a manner to rapidly warm-up the catalytic converter, even further reductions in tailpipe hydrocarbon emissions are achieved without the cost and complexity imposed by additional hardware components such as an electrically heated catalyst.

These and other features and advantages of the present invention may be better understood by considering the following detailed description of a preferred embodiment of the invention. In the course of this description, reference will frequently be made to the attached drawings.

BRIEF DESCRIPTION OF THE DRAWINGS

FIG. 2 is a flowchart showing the operation of a preferred embodiment.

DETAILED DESCRIPTION

Figure 1:
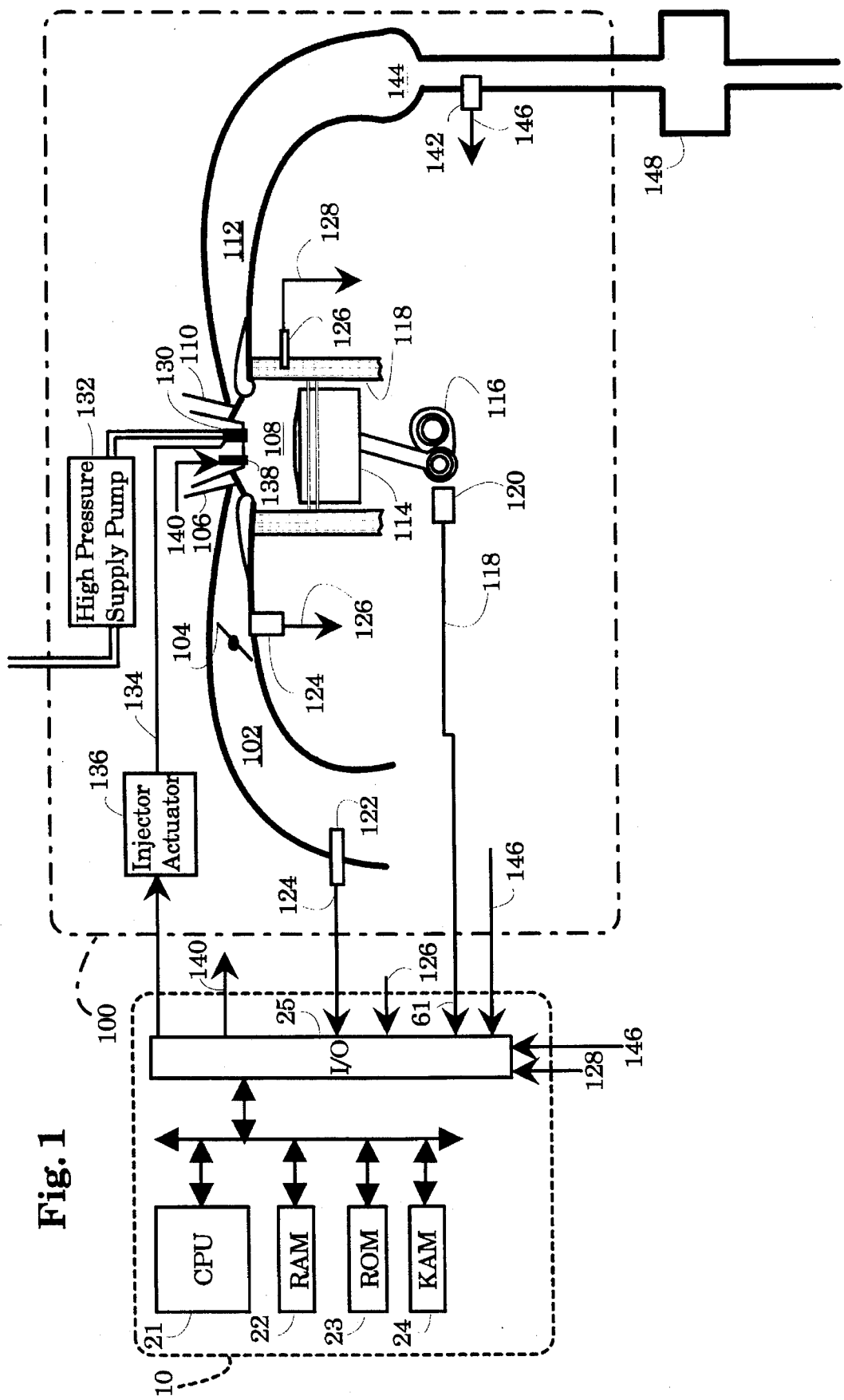
FIG. 1 of the drawings shows a block diagram of a preferred embodiment.

FIG. 1 of the drawings shows an Electronic Engine Controller (EEC) 10 and an internal combustion engine 100, which comprises a plurality of cylinders, one of which is shown in FIG. 1. Engine 100 draws an aircharge through an intake manifold 102, past a throttle plate 104, and intake valve 106 and into combustion chamber 108. An air/fuel mixture which consists of the aircharge and fuel injected by fuel injector 130, is ignited in combustion chamber 108, and exhaust gas produced from combustion of the air/fuel mixture is transported past exhaust valve 110 through exhaust manifold 112. A piston 114 is coupled to a crankshaft 116, and moves in a linear fashion within a cylinder defined by cylinder walls 118.

A crankshaft position sensor 120 detects the rotation of crankshaft 116 and transmits a crankshaft position signal 118 to EEC 10. Crankshaft position signal 118 preferably takes the form of a series of pulses, each pulse being caused by the rotation of a predetermined point on the crankshaft past sensor 120. The frequency of pulses on the crankshaft position signal 118 are thus indicative of the rotational speed of the engine crankshaft. A Mass AirFlow (MAF) sensor 122 detects the mass flow rate of air into intake manifold 102 and transmits a representative signal 124 to EEC 10. MAF sensor 122 preferably takes the form of a hot wire anemometer. A throttle position sensor 124 detects the angular position of throttle plate 104 and transmits a signal 126 indicative of throttle position to EEC 10. Throttle position sensor 124 preferably takes the form of potentiometer. An engine coolant temperature sensor 126 detects the temperature of engine coolant circulating within the engine and transmits a representative signal 128 to EEC 10. Engine coolant temperature sensor 126 preferably takes the form of a thermistor.

A fuel injector 130 is positioned to inject fuel directly into combustion chamber 108. Fuel injector 130 receives fuel from a high pressure fuel supply pump 132, and injects fuel into combustion chamber 108 in response to an injector control signal 134 received from injector driver 136, which operates under control of EEC 10. Fuel injector 130 preferably takes the form of a solenoid valve. A spark plug 138 operates in a conventional manner, under control of a spark timing signal 140 generated by the EEC 10 to ignite the air/fuel mixture in the combustion chamber 108. A Heated Exhaust Gas Oxygen (HEGO) sensor 142, positioned to sense exhaust gas flowing through exhaust pipe 144, transmits an exhaust composition signal 146, which is indicative of the oxygen concentration of the exhaust gas, to EEC 10. A three-way catalytic converter 148 processes exhaust gases to reduce hydrocarbon, nitrous oxide and carbon monoxide tailpipe emissions.

EEC 10 includes a central processing unit (CPU) 21 for executing stored control programs, a random-access memory (RAM) 22 for temporary data storage, a read-only memory (ROM) 23 for storing the control programs, a keep-alive-memory (KAM) 24 for storing learned values, a conventional data bus and I/O ports 25 for transmitting and receiving signals to and from the engine 100 and other systems in the vehicle.

A preferred embodiment advantageously implements a cold start routine to control the spark timing, the quantity of fuel delivered, along with the time in the engine cycle at which fuel is delivered, in a manner to reduce hydrocarbon emissions upon cold start.

FIG. 2 shows the steps executed by the EEC upon cold start of the engine to implement the cold-start routine. The cold-start routine may preferably be executed on an engine which is started over a range of different initial temperatures. The EEC preferably makes a determination of the engine temperature prior to entering the cold-start routine. The temperature determination may be determined as a function of the engine coolant temperature, or alternatively may be determined as a function of the temperature of the intake air charge or of the catalyst temperature, or may be determined as a combination of two or more of the foregoing temperatures. Depending upon the initial temperature, steps 204, 206 and 207 are altered in a manner to be described below. The steps shown in FIG. 2 are preferably implemented in the EEC as a program stored in ROM 23 which is executed by the CPU 21. As used herein the term engine cycle refers to a complete cycle of the engine which involves two complete rotations of the engine crankshaft and includes all four strokes-intake, compression, power and exhaust, completed by a four-stroke engine.

The cold start routine is entered at 201 and at 202 the EEC waits a predetermined period of time to allow the high pressure supply pump to reach a predetermined pressure. Typically the predetermined pressure will be approximately 90% of its normal operating pressure.

At step 203, the EEC initiates engine operation, and on the first engine cycle, for each cylinder, the quantity of fuel delivered and the spark timing are controlled to achieve combustion in the first engine cycle. This is preferably performed by injecting a quantity of fuel into the combustion chamber which results in an air/fuel ratio substantially equal to stoichiometry. In order to achieve a stoichiometric air/fuel ratio, the amount of fuel actually injected into the combustion chamber is greater than the amount required to achieve a stoichiometric air/fuel ratio in the gases, in order to account for combustion chamber wall wetting effects. As will be appreciated by those skilled in the art in view of the present disclosure, wall wetting effects are more pronounced when the surfaces of the combustion chamber are cold, thus preventing effective vaporization of the fuel which impacts the surfaces of the combustion chamber. Spark timing in the first engine cycle is preferably empirically determined to provide the greatest probability for combustion of the air/fuel mixture. In a preferred embodiment, the spark timing is approximately ten degrees before Top Dead Center (TDC) in the compression stroke.

At 204, for a predetermined number of cycles, the quantity of fuel injected and the spark timing are controlled in a manner to achieve rapid warm-up of combustion chamber surfaces. This is achieved by injecting a quantity of fuel to achieve an air/fuel mixture which is in a range from a stoichiometric air/fuel ratio to a slightly lean ratio. While a stoichiometric air/fuel ratio is preferable, an amount of fuel required to achieve a slightly lean air/fuel ratio is injected to account for the quantity of unvaporized fuel on the surfaces of the combustion chamber from the initial engine cycle which will vaporize as the surfaces become warmer. Spark timing at step 204 is advantageously advanced from the timing which produces the most power. By moving the spark timing to an earlier point in the engine cycle, an increased amount of energy released from combustion of the air/fuel mixture is used to warm up the surfaces of the combustion chamber. Step 204 is preferably executed for approximately five to fifty engine cycles. The exact number of cycles is empirically determined and is partially a function of the thermal conductivity of the material comprising the engine block, cylinder liners and piston. The number of cycles is additionally a function of a temperature value indicative of initial engine or catalyst temperature upon engine start-up. Preferably the number of cycles are stored in a table in ROM and are indexed by engine or catalyst temperature. As will be appreciated by those skilled in the art in view of the present disclosure, rapid heating of the combustion chamber surfaces reduces overall tailpipe hydrocarbon emissions during cold start by allowing more complete combustion of the air/fuel mixture in the combustion chamber.

At 206, for a predetermined number of cycles, the quantity of fuel injected and the spark timing are controlled in a manner to achieve rapid warm-up of exhaust system components, including the catalyst material contained in the catalytic converter. This is achieved by utilizing a split injection mode of fuel injection, seen designated by dotted line 205, in which the amount of fuel injected is injected during two discrete portions of the engine cycle. The total amount of fuel injected is preferably an amount which generates a stoichiometric air/fuel ratio. Approximately 90% of the total quantity of fuel to be injected is injected at the normal time in the engine cycle, which is preferably during the intake stroke. Normally, fuel injection is initiated at 240 to 330 degrees of crankshaft rotation before TDC and lasts for approximately 15 to 20 degrees. At step 206, approximately 90% of the fuel to be injected is injected at the normal injection time and the remaining 10% is injected late in the power stroke of the engine cycle. Spark timing at step 206 is advantageously retarded from the optimal timing which produces the most power. By moving the spark timing to a later point in the engine cycle, and injecting a small portion of fuel later in the engine cycle, an increased amount of energy released from combustion of the air/fuel mixture is used to warm up the surfaces of the exhaust system components step 206 is preferably executed for approximately five to fifty engine cycles. As with step 204, the exact number of cycles is empirically determined and is partially a function of the thermal conductivity of the material comprising the cylinder head (exhaust port), the catalyst, and other exhaust system components, and the proximity of the catalyst to the engine. Moreover, as explained above, the exact number of cycles will preferably vary with initial engine temperature in a manner similar to that described in the description accompanying step 204. As will be appreciated by those skilled in the art in view of the present disclosure, rapid heating of the exhaust system components reduces overall tailpipe hydrocarbon emissions during cold start by enhancing catalytic conversion efficiency.

At step 207, the proportion of fuel injected between the first portion, in the intake stroke, and the second portion, in the expansion stroke, is altered in order to achieve a further increase in the temperature of exhaust system components. Spark timing remains as in step 206, but the amount of fuel injected during the intake stroke is reduced to approximately 80% of the total amount to be injected and the amount of fuel injected during the power stroke is increased to approximately 20% of the amount to be injected. Step 207 is preferably executed for approximately five to fifty engine cycles, with the exact number of cycles being empirically determined based primarily on the exhaust system components and geometry. As with steps 204 and 206, the exact number of cycles will vary with the initial engine temperature. Upon completion of step 207, the cold start routine is exited and subsequent engine controls are effected by the EEC 10.

Preferably, the variation in spark timing achieved in the cold start routine is limited within predefined boundaries to differences in engine operation which are noticeable to the vehicle driver.

It is to be understood that the specific mechanisms and techniques which have been described are merely illustrative of one application of the principles of the invention. For instance, as noted above, the exact number of cycles for which each of the steps of the cold start routine are executed will vary depending upon engine and exhaust system temperature, material, size and geometry. Although the preferred embodiment is applicable to a spark ignited gasoline engine, the principles of the invention may also be used in spark ignited engines utilizing alternative liquid fuels. Numerous additional modifications may be made to the methods and apparatus described without departing from the true spirit and scope of the invention.

What is claimed is:

1. In a spark ignited internal combustion engine which includes fuel injectors positioned to inject fuel directly into combustion chambers of the engine, a high pressure fuel supply pump for pumping fuel to said fuel injectors, and an engine controller for controlling operation of the engine, a method of reducing hydrocarbon emissions generated by the engine during cold start, the method comprising the steps of:

at engine start, upon initiation of electrical power to said engine, waiting a predetermined period of time to allow said high pressure fuel supply pump to reach a predetermined operating pressure and upon the first engine cycle, controlling the quantity of fuel injected into each cylinder and the ignition timing to achieve combustion in the first engine cycle by injecting a quantity of fuel to compensate for combustion chamber wall wetting effects and to achieve a substantially stoichiometric air/fuel ratio in each combustion chamber, and controlling spark timing according to an empirically determined value which provides the greatest probability for ignition;

for a first predetermined number of subsequent engine cycles, controlling the quantity of fuel injected into each cylinder and the spark timing to rapidly increase the temperature of surfaces of said combustion chambers by injecting a quantity of fuel into each combustion chamber to achieve an air/fuel ratio substantially equal to or marginally leaner than a stoichiometric air/fuel ratio and advancing spark timing in each cylinder by a predetermined number of degrees of crankshaft rotation from a predetermined optimal ignition timing point; and for a subsequent second predetermined number of engine cycles, controlling the quantity of fuel injected into each cylinder and the spark timing to rapidly increase the temperature of the surfaces of the exhaust system components of the engine, by injecting a first quantity of fuel for each engine cycle during the intake stroke of the engine cycle and injecting a second quantity of fuel later in the same engine cycle during the combustion stroke of the engine cycle, and retarding spark timing from the predetermined optimal ignition timing point.

2. The method as set forth in claim 1 comprising the further step of decreasing, for a third predetermined number of engine cycles, the amount of fuel injected during the intake stroke and increasing the amount of fuel injected during the expansion stroke by a corresponding amount.

3. The method as set forth in claim 2 comprising the additional step of generating a temperature value indicative of the initial temperature of the engine and altering said first and said second predetermined number of engine cycles as a function of said temperature value.

4. The method as set forth in claim 1 comprising the additional step of generating a temperature value indicative of the initial temperature of the engine and altering said first and said second predetermined number of engine cycles as a function of said temperature value.

5. In a spark ignited internal combustion engine which includes a plurality of cylinders, each cylinder having a corresponding combustion chamber and each of said combustion chambers having disposed therein a fuel injector positioned to inject fuel directly into the combustion chamber of the engine, said engine further including a high pressure fuel supply pump for pumping fuel to each of said fuel injectors, and an engine controller for controlling operation of the engine, each of said combustion chambers being characterized by a spark timing which provides a predetermined optimum performance, a method of reducing hydrocarbon emissions generated by the engine during cold start, the method comprising the steps of:

at engine start, upon initiation of electrical power to said engine, waiting a predetermined period of time to allow said high pressure fuel supply pump to reach a predetermined operating pressure and upon the first engine cycle, of the engine, controlling the quantity of fuel injected into each cylinder and the ignition timing to achieve combustion in the first engine cycle by injecting a quantity of fuel to compensate for combustion chamber wall wetting effects and to achieve a substantially stoichiometric air/fuel ratio in each combustion chamber, and controlling ignition timing according to an empirically determined value which provides the greatest probability for ignition; and for a first predetermined number of subsequent engine cycles, controlling the quantity of fuel injected into each cylinder and the ignition timing to rapidly increase the temperature of the surfaces of said combustion chambers by injecting a quantity of fuel into each combustion chamber to achieve an air/fuel ratio substantially equal to or marginally greater than a stoichiometric air/fuel ratio and advancing ignition in each cylinder by a predetermined number of degrees of crankshaft rotation from said optimal ignition timing point;

for a subsequent, second predetermined number of engine cycles, controlling the quantity of fuel injected and the spark timing to rapidly increase the temperature of the surfaces of the exhaust system components of the engine, by retarding the spark timing by a predetermined number of degrees of crankshaft rotation from said optimal ignition timing point and controlling the quantity of fuel injected into each cylinder according to a split fuel injection mode in which, for a third predetermined number of engine cycles, a first predetermined amount of fuel is injected during the intake stroke of each engine cycle and a second predetermined amount of fuel is injected during the combustion stroke of each engine cycle and for a fourth predetermined number of engine cycles, subsequent to said third predetermined number of engine cycles, a third predetermined amount of fuel is injected during the intake stroke of each engine cycle and a fourth predetermined amount of fuel is injected during the combustion stroke of each engine cycle.

6. The method as set forth in claim 5 wherein the sum of the first predetermined amount of fuel and the second predetermined amount of fuel generates an air/fuel ratio in said combustion chamber which is substantially equal to stoichiometry.

7. The method as set forth in claim 6 wherein the sum of the third predetermined amount of fuel and the fourth predetermined amount of fuel generates an air/fuel ratio in said combustion chamber which is substantially equal to stoichiometry.

8. The method as set forth in claim 7 wherein the first predetermined amount of fuel is greater than said second predetermined amount of fuel and said third predetermined amount of fuel is greater than said fourth predetermined amount of fuel.

9. The method as set forth in claim 8 wherein the first predetermined amount of fuel is greater than said third predetermined amount of fuel.

10. The method as set forth in claim 9 wherein the first predetermined amount of fuel is approximately nine times greater than said second predetermined amount of fuel.

11. The method as set forth in claim 10 wherein the third predetermined amount of fuel is approximately four times greater than said fourth predetermined amount of fuel.

12. The method as set forth in claim 11 comprising the additional step of generating a temperature value indicative of the initial temperature of the engine and altering said first and said second predetermined number of engine cycles as a function of said temperature value.

13. The method as set forth in claim 5 comprising the additional step of generating a temperature value indicative of the initial temperature of the engine and altering said first and said second predetermined number of engine cycles as a function of said temperature value.

* * * * *